(12) United States Patent
Pang et al.

(10) Patent No.: US 11,233,624 B2
(45) Date of Patent: Jan. 25, 2022

(54) CYCLIC TIME-SLOTTED OPERATION IN A WIRELESS INDUSTRIAL NETWORK

(71) Applicant: Hitachi Energy Switzerland AG, Baden (CH)

(72) Inventors: Zhibo Pang, Västerås (SE); Roger Jansson, Västerås (SE); Michele Luvisotto, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 25 days.

(21) Appl. No.: 16/777,520

(22) Filed: Jan. 30, 2020

(65) Prior Publication Data

US 2020/0252187 A1   Aug. 6, 2020

(30) Foreign Application Priority Data

Feb. 6, 2019  (EP) .................................... 19155669

(51) Int. Cl.
  *H04W 84/18* (2009.01)
  *H04L 5/00* (2006.01)
  (Continued)

(52) U.S. Cl.
  CPC ....... *H04L 5/0082* (2013.01); *H04W 72/0446* (2013.01); *H04W 72/1263* (2013.01); *H04W 84/18* (2013.01); *H04W 88/06* (2013.01)

(58) Field of Classification Search
  CPC combination set(s) only.
  See application file for complete search history.

(56) References Cited

U.S. PATENT DOCUMENTS

| 4,809,217 A | 2/1989 | Flora et al. |
| 5,392,448 A | 2/1995 | Frankel et al. |

(Continued)

FOREIGN PATENT DOCUMENTS

| CN | 106850565 A | 6/2017 |
| EP | 0267974 A1 | 5/1988 |

OTHER PUBLICATIONS

European Search Report Application No. EP 19 15 5669 Completed: Jun. 25, 2019; dated Jul. 3, 2019 10 pages.

(Continued)

*Primary Examiner* — Julio R Perez
(74) *Attorney, Agent, or Firm* — Slater Matsil, LLP (57) ABSTRACT

A method, a communication device, a computer program, and a computer program product for cyclic time-slotted operation in a wireless industrial network. The communication device includes a memory having a first memory area and a second memory area. The method includes running an application software at application layer. The application software is associated with a first pointer. The method includes operating a communication hardware at physical layer. The communication hardware is associated with a second pointer. The first pointer and the second pointer in a given timeslot point at a respective different one of the memory areas, such that in the given timeslot the application software is enabled to access one of the memory areas and the communication hardware is enabled to access the other of the memory areas. The method includes swapping the pointers to the memory areas at the end of each cycle of the cyclic time-slotted operation.

20 Claims, 6 Drawing Sheets

(51) Int. Cl.
 *H04W 72/04* (2009.01)
 *H04W 72/12* (2009.01)
 *H04W 88/06* (2009.01)

(56) References Cited

U.S. PATENT DOCUMENTS

| | | |
|---|---|---|
| 5,884,100 A | 3/1999 | Normoyle et al. |
| 2010/0199358 A1* | 8/2010 | Yao .................. H04L 67/306 726/27 |
| 2015/0295829 A1 | 10/2015 | Palmhager et al. |
| 2019/0163931 A1* | 5/2019 | Wolverton ............ G06F 3/0637 |

OTHER PUBLICATIONS

Mohiuddin Ahmed et al.: "Intra-vhicular Wireless Networks". Globecom Workshops; 2007 IEEE, IEEE, PI, Nov. 1, 2007: XP031207107 9 pages.
Dan Saks; "Mapping Memory"; Emmbedded; Aug. 11, 2004 Website: https://tinyurl.com/yb2vyuh5 (Access site on Jan. 30, 2020).
"Sharing memory between processes"; Boost C++ Libraries Website: https://tinyurl.com/ybza5f24 (Access site on Jan. 30, 2020).

* cited by examiner

Fig. 7

CYCLIC TIME-SLOTTED OPERATION IN A WIRELESS INDUSTRIAL NETWORK

TECHNICAL FIELD

Embodiments presented herein relate to a method, a communication device, a computer program, and a computer program product for cyclic time-slotted operation in a wireless industrial network.

BACKGROUND

Industrial communications systems are commonly used in power grid control applications (e.g. for substation automation) to enable equipment control and monitoring. These communications systems have hence to accommodate different types of traffic, coming from informational technology (IT) infrastructure (e.g. remote monitoring devices, metering devices, etc.) as well as from operational technology (OT) infrastructure (e.g. control systems). Different traffic flows have different specific requirements in terms of determinism, latency and reliability, which should be taken into account when the protocol stack and, in particular, the medium access control (MAC) layer in the protocol stack, is designed.

In this regard, the IEEE time-sensitive networking (TSN) working group is developing new standards that allow precise scheduling of heterogeneous traffic flows at the MAC layer of Ethernet networks. Thanks to the usage of time-aware shaper and preemption mechanisms, TSN is able to guarantee to each traffic flow a bounded worst-case latency as well as to implement redundancy and fault tolerance.

Traditional communication systems rely on protocol stacks where payload data are moved between different layers in the protocol stack. More specifically, during a transmission process, data generated at the application layer (typically implemented in software (SW)) is copied all the way down to the physical layer, where the communication hardware (HW) is in charge of reading, processing and sending the data over the air towards its destination. Conversely, in the reception process, data is first received at the physical layer by the communication HW, processed and stored in a local memory, from which the data is copied all the way up to the application layer.

The described procedure consumes time, which is a critical resource in industrial communication networks used in the automation of power systems, for example substation automation. Such networks must provide low-latency transfer of data.

Hence, there is still a need for an improved communication between nodes in wireless industrial networks.

SUMMARY

An object of embodiments herein is to provide efficient cyclic time-slotted operation in a wireless industrial network, enabling improved communication between communication devices in the wireless industrial network.

According to a first aspect there is presented a method for cyclic time-slotted operation in a wireless industrial network. The method is performed by a communication device. The communication device comprises a memory having a first memory area and a second memory area. The method comprises running an application software at application layer. The application software is associated with a first pointer. The method comprises operating a communication hardware at physical layer. The communication hardware is associated with a second pointer. The first pointer and the second pointer in a given timeslot point at a respective different one of the memory areas, such that in said given timeslot the application software is enabled to access one of the memory areas and the communication hardware is enabled to access the other of the memory areas. The method comprises swapping the pointers to the memory areas at the end of each cycle of the cyclic time-slotted operation.

According to a second aspect there is presented a communication device for cyclic time-slotted operation in a wireless industrial network. The communication device comprises a memory having a first memory area and a second memory area. The communication device further comprises processing circuitry. The processing circuitry is configured to cause the communication device to run an application software at application layer. The application software is associated with a first pointer. The processing circuitry is configured to cause the communication device to operate a communication hardware at physical layer. The communication hardware is associated with a second pointer. The first pointer and the second pointer in a given timeslot point at a respective different one of the memory areas, such that in said given timeslot the application software is enabled to access one of the memory areas and the communication hardware is enabled to access the other of the memory areas. The processing circuitry is configured to cause the communication device to swap the pointers to the memory areas at the end of each cycle of the cyclic time-slotted operation.

According to a third aspect there is presented a communication device for cyclic time-slotted operation in a wireless industrial network. The communication device comprises a memory having a first memory area and a second memory area. The communication device further comprises an execution module configured to run an application software at application layer. The application software is associated with a first pointer. The communication device further comprises an execution module configured to operate a communication hardware at physical layer. The communication hardware is associated with a second pointer. The first pointer and the second pointer in a given timeslot point at a respective different one of the memory areas, such that in said given timeslot the application software is enabled to access one of the memory areas and the communication hardware is enabled to access the other of the memory areas. The communication device further comprises a swap module configured to swap the pointers to the memory areas at the end of each cycle of the cyclic time-slotted operation.

According to a fourth aspect there is presented a computer program for cyclic time-slotted operation in a wireless industrial network, the computer program comprising computer program code which, when run on a communication device comprising a memory having a first memory area and a second memory area, causes the communication device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method, these communication devices, this computer program, and this computer program product provide efficient cyclic time-slotted operation in a wireless industrial network.

Advantageously this method, these communication devices, this computer program, and this computer program product improve the communication between communication devices in the wireless industrial network.

Advantageously the use of a shared memory for the application software and the communication hardware reduces the latency in data propagation.

Advantageously the use of alternating pointers to the memory areas simplifies handling of data consistency.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
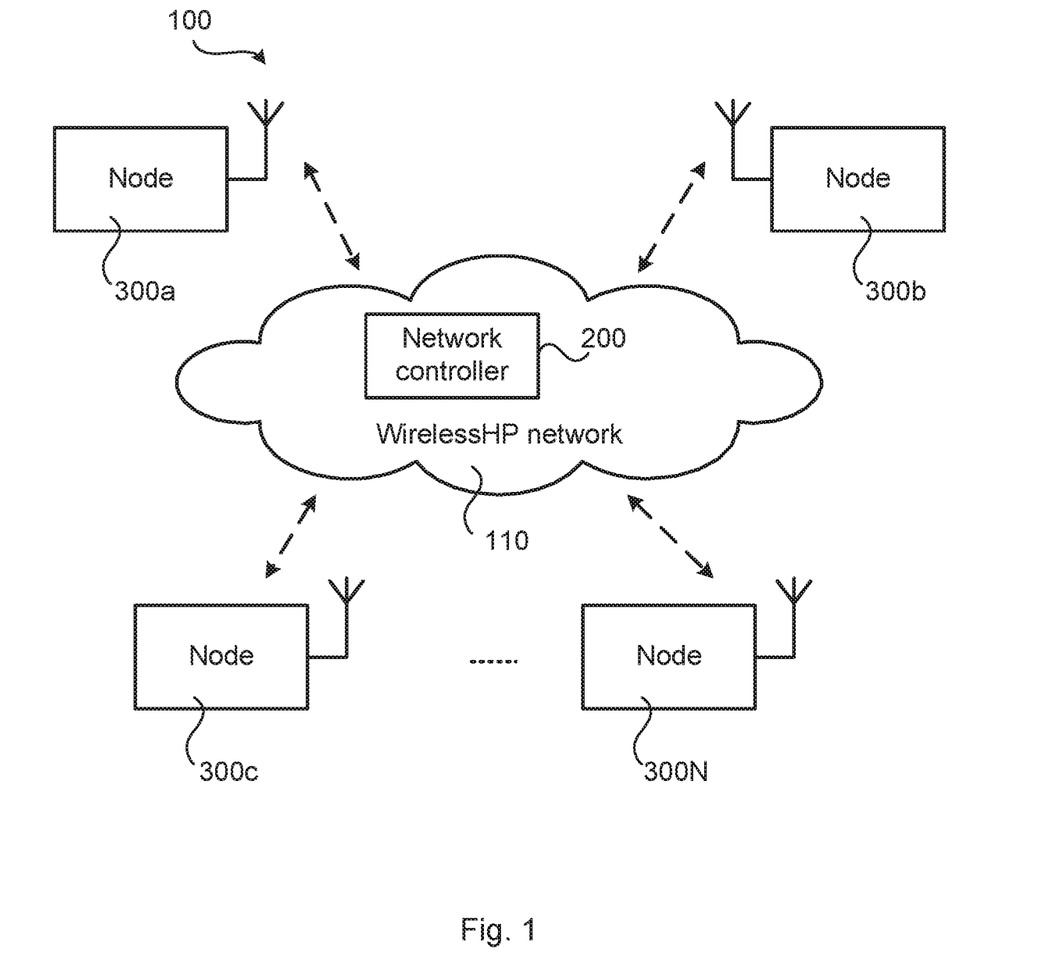
FIG. 1 is a schematic diagram illustrating a wireless industrial network according to embodiments.

FIG. 1 schematically illustrates a wireless communications network 100 wherein the herein disclosed embodiments apply. Network entities denoted nodes 300a, 300b, . . . , 300N are equipped with a radio frequency (RF) front-end that allows them to communicate over a wireless network 110 with a network controller 200. Each node 300a:300N may represent a component of a substation automation system, such as a gateway, circuit breaker, circuit protector, transformer, switchgear, etc., that is configured for exchanging control messages and data with the network controller 200.

The topology of the network 100 is not limited to a star structure, where the nodes 300a:300N can communicate only with the network controller 200. Thus, in some aspects node-to-node communication is allowed between the nodes 300a:300N. In this way line, tree and mesh topologies can be easily built.

It is assumed that data is generated by the nodes 300a:300N and is communicated towards the network controller 200. It is further assumed that control signaling is generated by the network controller 200 and is communicated towards the nodes 300a:300N.

The nodes 300a:300N and the network controller 200 will hereinafter collectively be referred to as communication devices 300a:300N, 200 when no distinction needs to be made between the nodes 300a:300N and the network controller 200.

As disclosed above there is a need for low latency and high reliability communication between communication devices 300a:300N, 200 in the wireless industrial network 100.

In further detail, the time wasted by copying data between different layers of the protocol stack should be minimized. At the same time, the consistency between the data generated/received by the application SW and the data processed by the communication HW should be ensured at any time. This is true both for the network controller 200 and the nodes 300a:300N.

The herein disclosed embodiments relate to wireless industrial networks, in which raw communication errors are more frequent with respect to wired networks. Consequently, mechanisms to handle these errors and possibly repair them must be devised. In order to minimize the aforementioned latency, error handling should be handled as much as possible by the HW and be transparent to the SW.

The embodiments disclosed herein in particular relate to mechanisms for cyclic time-slotted operation in a wireless industrial network. In order to obtain such mechanisms there is provided a communication device 300a:300N, 200, a method performed by the communication device 300a:300N, 200, a computer program product comprising code, for example in the form of a computer program, that when run on a communication device 300a:300N, 200, causes the communication device 300a:300N, 200 to perform the method.

Figure 2:
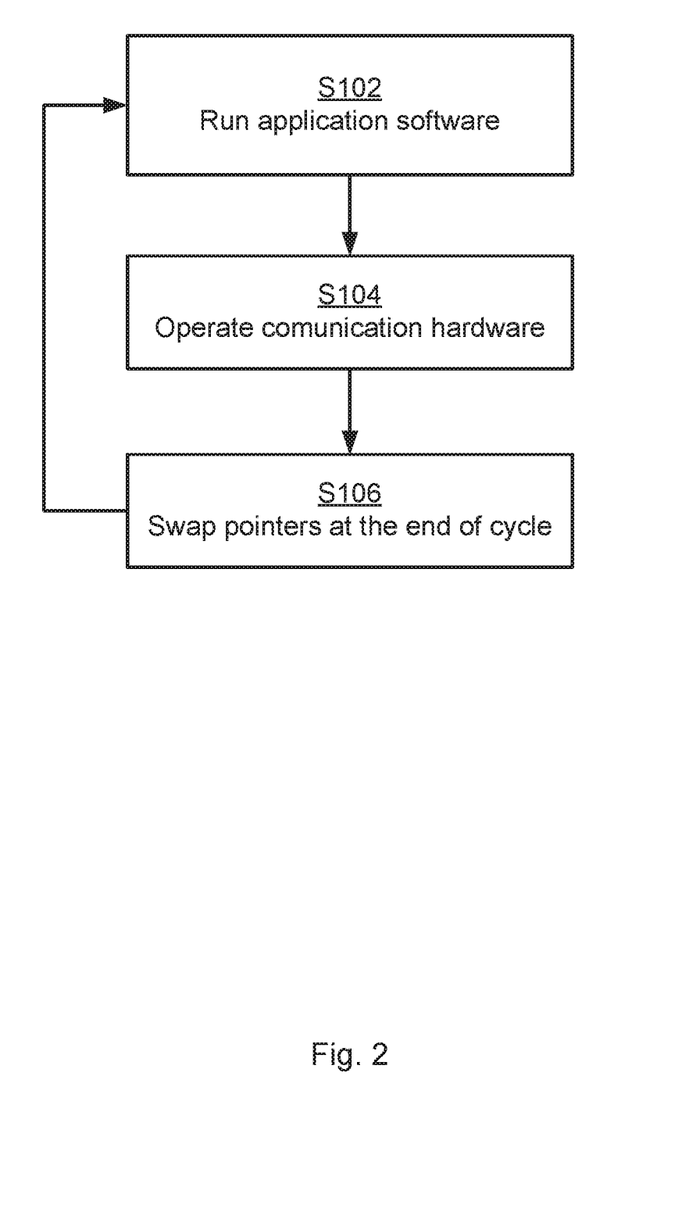
FIGS. 2 and 5 are flowcharts of methods according to embodiments.

FIG. 2 is a flowchart illustrating embodiments of methods for cyclic time-slotted operation in a wireless industrial network. The methods are performed by the communication device 300a:300N, 200. The communication device comprises a memory having a first memory area and a second memory area. The methods are advantageously provided as computer programs 720.

It is assumed that an application software is run at the communication device. In particular, the communication device is configured to perform step S102.

S102: The communication device runs an application software at application layer. Application layer here refers to the application layer of the Open Systems Interconnection (OSI) model. The application software is associated with a first pointer.

It is further assumed that a communication hardware is operated at the communication device. In particular, the communication device is configured to perform step S104.

S104: The communication device operates a communication hardware at physical layer. Physical layer here refers to the physical layer of the OSI model. The communication hardware is associated with a second pointer.

In general terms, steps S102 and S104 might be performed in parallel.

The first pointer and the second pointer in a given timeslot point at a respective different one of the memory areas, such that in the given timeslot the application software is enabled to access one of the memory areas and the communication hardware is enabled to access the other of the memory areas. To access one of the memory areas involves to read from, or write to, said one of the memory areas.

Hence, to ensure low-latency and data consistency between the application SW running on this node and its communication HW, the generated data/signaling and received data signaling for the communication device is thus stored in two memory areas in a memory shared between the application SW and the communication HW, and with two pointers alternatingly pointing to the two memory areas such that, at any given time, one pointer points at one of the two memory areas and the other pointer points at the other of the two memory areas. One of the pointers is used by the application SW and the other of the pointers is used by the communication HW.

The pointers are swapped after each cycle. That is, at the end of each cycle the pointers to the memory areas are swapped. In particular, the communication device is configured to perform step S106.

S106: The communication device swaps the pointers to the memory areas at the end of each cycle of the cyclic time-slotted operation.

That is, assuming that the first pointer in a particular timeslot points at the first memory area and thus that the second pointer in the same particular timeslot points at the second memory area, then, when the pointers have been swapped, the first pointer points at the second memory area and thus the second pointer points at the first memory area.

This method can be used to ensure low-latency, data consistency and error handling at the communication device.

Embodiments relating to further details of cyclic time-slotted operation in a wireless industrial network as performed by the communication device 300a:300N, 200 will now be disclosed.

Figure 3:
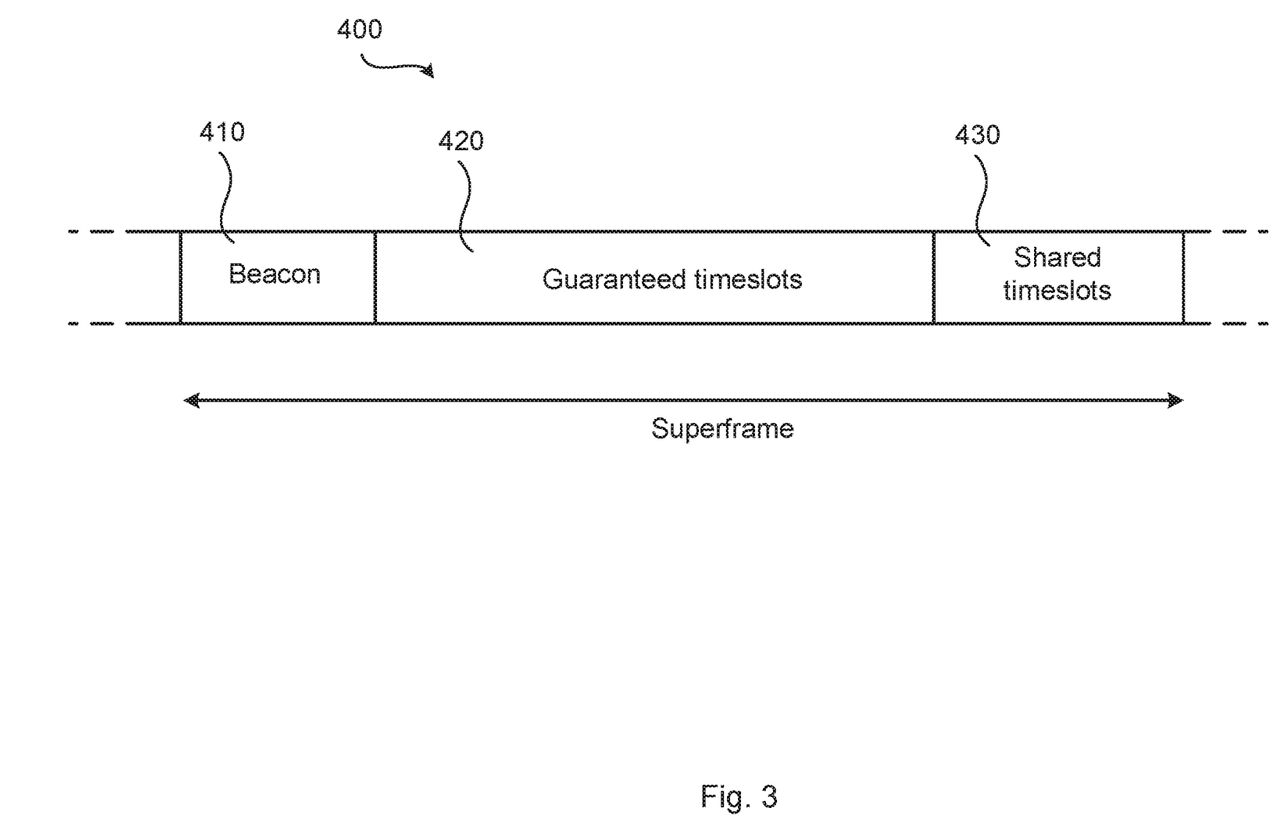
FIG. 3 schematically illustrates a superframe according to an embodiment.

FIG. 3 schematically illustrates the structure of a superframe 400 in which guaranteed timeslots 420 are provided. A beacon signal 410 as periodically transmitted by the network controller 200 could indicate the beginning of the superframe 400. The beacon signal 410 is followed by a set of guaranteed timeslots 420. The nodes 300a:300N are, by means of the guaranteed timeslots 420, guaranteed one or more time/frequency resource units in the superframe 400. Hence, according to an embodiment, the timeslots of each cycle are part of a set of guaranteed timeslots 420.

In some aspects, during each guaranteed timeslot only one node 300a:300N can access the communication channel, thus avoiding collisions. The access to the communication channel might be organized in a time-division multiple access (TDMA) fashion. In particular, according to an embodiment, each of the first memory area and the second memory area has as many cells for the application software and the communication hardware to access as there are timeslots in the set of guaranteed timeslots 420.

The superframe 400 ends with some shared timeslots 430, which initially are not assigned to any specific node 300a:300N. That is, according to an embodiment, the superframe 400 further comprises a set of shared timeslots 430. One or more of the nodes 300a:300N might, additionally, be allocated time/frequency resource units among one or more of the shared timeslots 430, for example to handle communication errors (see below). That is, according to an embodiment, the shared timeslots 430 are used for handling data/signaling that has not been successfully received or transmitted. In absence of such communication errors the shared timeslots 430 might be used for transmission of other data, such as non-time critical data. Examples of such non-time critical data are firmware updates and software updates for the nodes 300a:300N.

As in the illustrative example of FIG. 3, in some aspects one occurrence of the beacon signal 410, one occurrence of a set of guaranteed timeslots 420 and one occurrence of a set of shared timeslots 430 define one superframe 400. That is, according to an embodiment, each set of guaranteed timeslots 420 is part of a superframe 400.

One cycle can be defined in terms of the length of the superframe 400. In particular, according to an embodiment, each cycle lasts as long as the superframe 400, and the pointers are swapped upon start of each superframe 400. Further in this respect, the application software might be cyclically executed, such that one cycle of the application software is executed per superframe. This could be the case where the communication device 200, 300a:300N communicates pieces of data, or signals, according to a predefined repetitive pattern, such as periodically.

Figure 4:
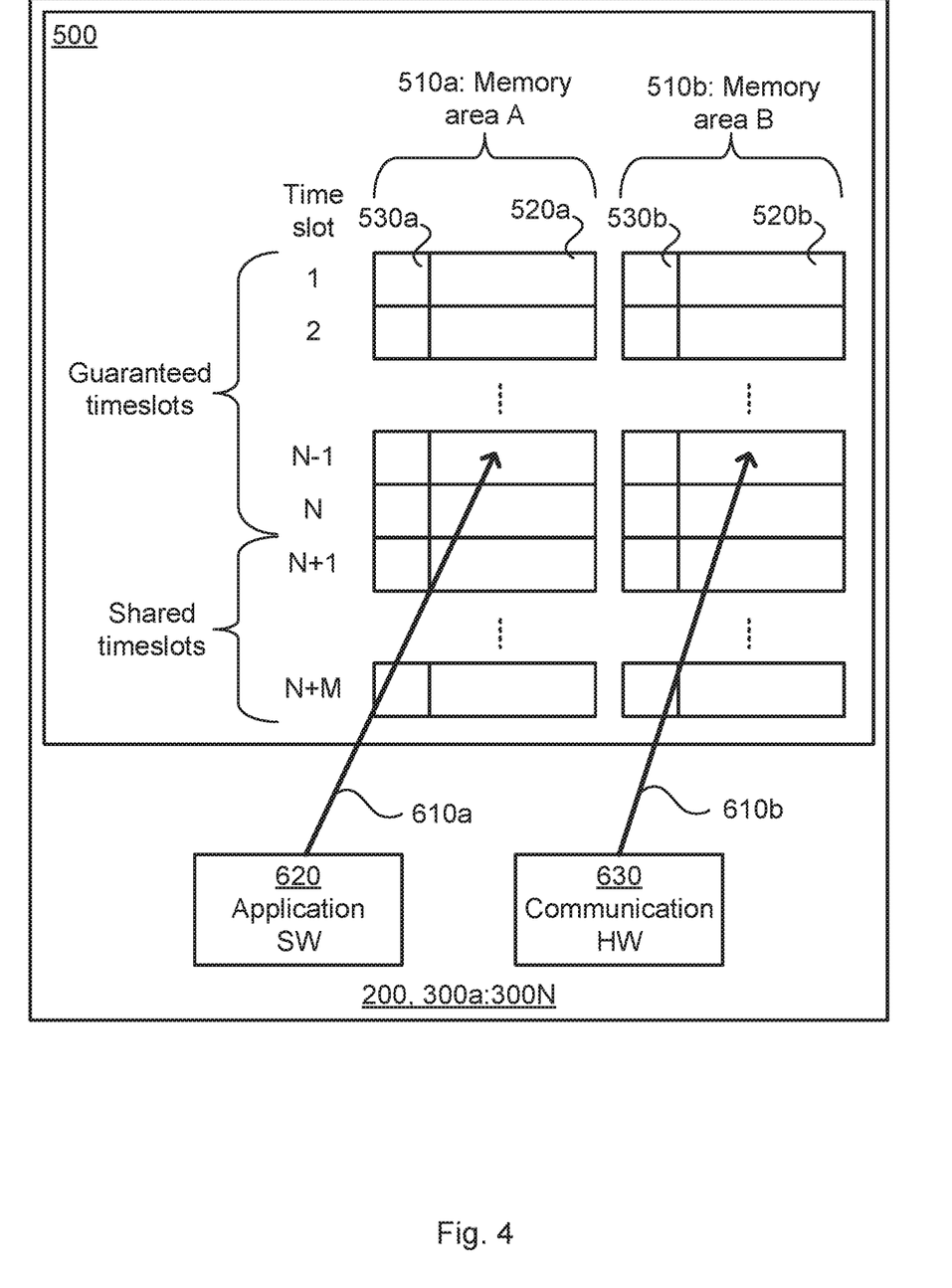
FIG. 4 schematically illustrates a communication device according to an embodiment.

FIG. 4 schematically illustrates a memory having a first memory area 510a (denoted memory A) and a second memory area 510b (denoted memory area B). The memory comprises four cells 520a, 520b, 530a, 530b per row. Cells 520a, 520b are memory cells for storing data and cells 530a, 530b are status fields for indicating failed transmission/reception. Particularly, according to an embodiment each memory area has status fields, and failure of the communication hardware 630 to transmit or receive a packet in any timeslot is indicated in the status field of this timeslot.

The memory of the illustrative example of FIG. 4 is suitable for a communication device being a network controller 200; for a communication device being a node 300a:300N the memory 500 could have fewer cells (corresponding to fewer rows in the table of FIG. 4). In more detail, assuming there are N nodes 300a:300N in the wireless industrial network 100 (in addition to the network controller 200), the memory might be represented by a table having N rows, one for each node 300a:300N. The table in FIG. 4 also has M empty rows at the end, reserved for retransmission of previously failed messages in the same superframe (if there are any). Thus, the maximum value of M is identical to the number of shared timeslots 430 in one superframe 400. In this respect, if communication at a guaranteed timeslot 420 has failed the communication hardware 630 has the possibility, or option, to retry the failed communication in one of the shared timeslots 430 within the same superframe 400 as the guaranteed timeslot 420 where the communication failed.

As schematically illustrated in FIG. 4, when the pointer 610a associated with the application software 620 points at one of the memory areas, the pointer 610b associated with the communication hardware 630 points at the other memory area, thus ensuring the data consistency. In the illustrative example of FIG. 4, the pointer 610a associated with the application software 620 points at timeslot N-1 of memory area A, and the pointer 610b associated with the communication hardware 630 points at timeslot N-1 of memory area B. In timeslot N, the pointer 610a associated with the application software 620 will point at timeslot N of memory area A, and the pointer 610b associated with the communication hardware 630 will point at timeslot N of memory area B, and so on until the last timeslot (i.e., timeslot N+M). The pointers 610a, 610b to the memory areas 610a, 610b are swapped every time the superframe duration has elapsed. That is, at the first timeslot (i.e., of timeslot 1) at the next superframe, the pointer 610a associated with the application software 620 will point at timeslot 1 of memory area B, and the pointer 610b associated with the communication hardware 630 will point at timeslot 1 of memory area A.

If communication at some timeslot has not been successful within the superframe, and also communication of the data/signal in the timeslot for which communication failed has failed also in one of the shared timeslots, the application software 620 will see an error in the status field for the timeslot where communication failed and will decide how to handle the situation, e.g. if data/signaling should be retransmitted or new data/signaling transmitted.

In some aspects the pointers are swapped more often than once per superframe 400. This could be the case where there are relative few nodes 300a:300N and/or where relatively small amounts of data/signaling is communicated between the nodes 300a:300N and the network controller 200. Particularly, according to an embodiment, each cycle lasts as long as duration of one timeslot, and wherein the pointers are swapped upon start of each timeslot. Further in this respect, according to an embodiment the application software 620 is cyclically executed, such that the application software 620 is executed once per timeslot.

Figure 5:
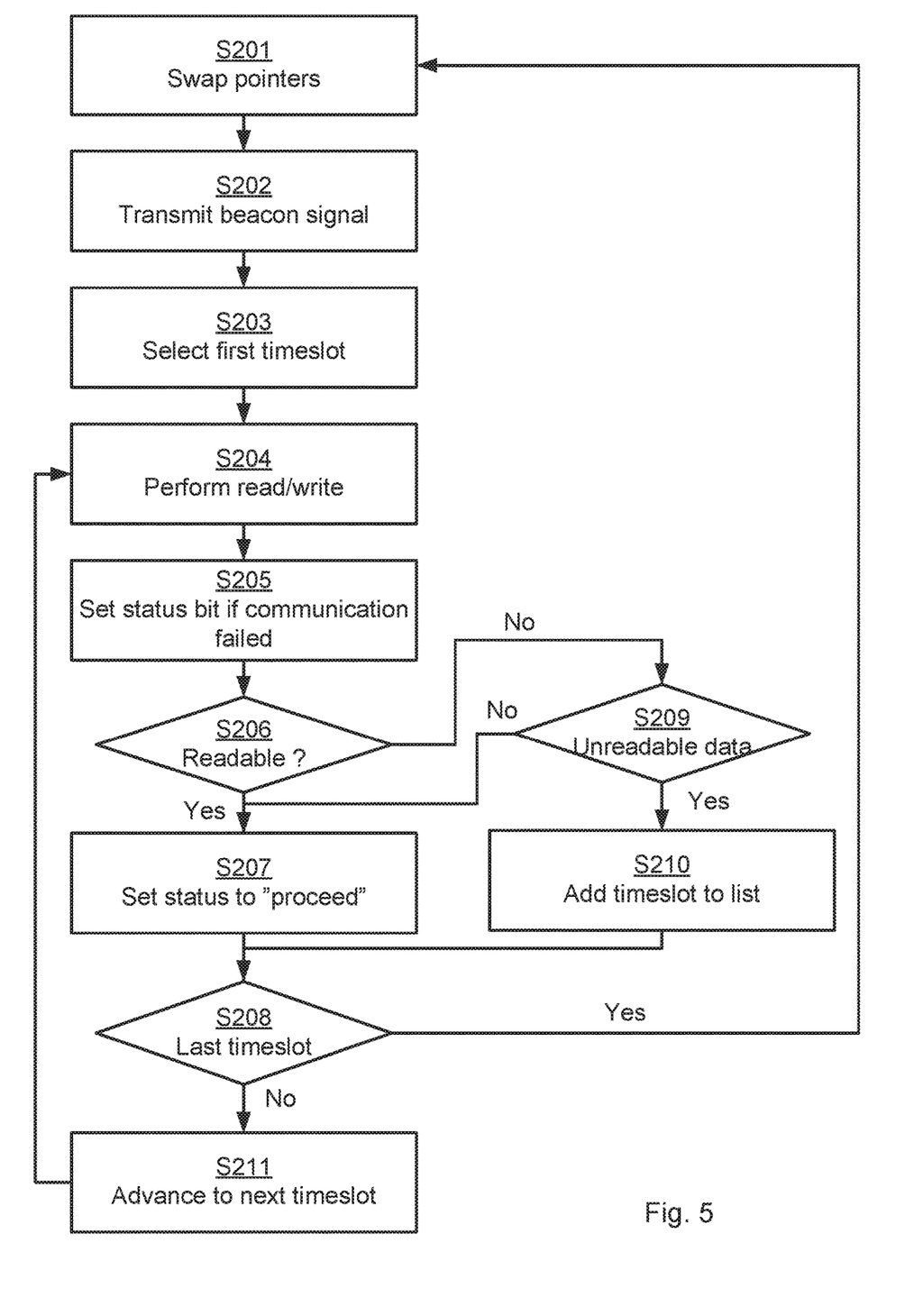

FIG. 5 is flowchart of a method for cyclic time-slotted operation in a wireless industrial network as performed by a communication device embodied as the network controller 200 and relating to operations for the communication hardware 630.

S201: The pointers 610a, 610b are swapped.

S202: A beacon signal 410 is transmitted in order to indicate start of the superframe 400 and to provide synchronization of the same.

S203: The first timeslot of the superframe 400 is selected.

S204: Read/write operations are performed in the memory cell 520a, 520b currently pointed at by the pointer 610b. In this respect, data to be sent during the timeslot in the memory area pointed at by pointer 610b is read and sent during the timeslot, and data received during the timeslot, if any, is written back to it. The status field is then updated with appropriate values for fail, timeout, or OK, as in step S205.

S205: If a communication failure occurred in step S204, a status bit is set in the status field 530a, 530b in the memory 500 of the timeslot to indicate the communication failure.

S206: A check is made if any received data/signaling is readable. If the data is readable, step S207 is entered. Else, step S209 is entered.

S207: The status of the timeslot is set to "processed".

S208: It is checked if the timeslot was the last in the superframe 400. If yes, step S201 is entered again for a new superframe 400. Else, step S211 is entered.

S209: It is checked if unreadable data is transmitted in the guaranteed timeslot. If yes, step S210 is entered. Else step S207 is entered.

S210: It is determined whether or not the data of the failed communication should be communicated again. If decided to communicate the data/signal again within the same superframe, the timeslot is added to a list of timeslots in which the data is to be received again (if the list is not full).

S211: Advancement is made to the next timeslot in the superframe 400. Step S204 is entered again for this next timeslot in the superframe 400.

As a first simplified example, consider a scenario where there is one single node 300a in the wireless industrial network 100 communicating with the network controller 200, that each superframe 400 has only one single timeslot 420, and that the method is performed by the network controller 200.

First superframe: The pointer 610a of the application software 620 points at memory area A and the pointer 610b of the communication hardware 630 points at memory area B. Command1 is generated by the network controller 200 and stored in the memory cell as pointed at by the pointer 610a of the application software 620. Data1 as previously generated by the node 300a is received by the communication hardware 630 from the node 300a and stored in the memory cell as pointed at by the pointer 610b of the communication hardware 630.

Second superframe: The pointer 610a of the application software 620 points at memory area B and the pointer 610b of the communication hardware 630 points at memory area A. Data1 is fetched from the memory cell as pointed at by the pointer 610a of the application software 620. Command1 is fetched by the communication hardware 630 from the memory cell as pointed at by the pointer 610b of the communication hardware 630 and transmitted towards the node 300a.

Third superframe: As for the first superframe but with new Data2 (as requested according to Command1) and new Command2 instead of Command1.

As a second simplified example, consider a scenario where there is one single node 300a in the wireless industrial network 100 communicating with the network controller 200, that each superframe 400 has only one single timeslot 420, and that the method is performed by this network node 300a.

First superframe: The pointer 610a of the application software 620 points at memory area A and the pointer 610b of the communication hardware 630 points at memory area B. Data1 is measured by the node and stored in the memory cell as pointed at by the pointer 610a of the application software 620. Command1 for the node 300 as previously generated by the network controller 200 is received by the communication hardware 630 from the network controller 200 and stored in the memory cell as pointed at by the pointer 610b of the communication hardware 630.

Second superframe: The pointer 610a of the application software 620 points at memory area B and the pointer 610b of the communication hardware 630 points at memory area A. Data1 is fetched from the memory cell as pointed at by the pointer 610b of the communication hardware 630 and transmitted towards the network controller 200. Command1 is fetched by the application software 620 from the memory cell as pointed at by the pointer 610a of the application software 620.

Third superframe: As for the first superframe but with new Data2 (as requested according to Command1) and new Command2 instead of Command1.

As a third simplified example, consider a scenario where there is one single node 300a in the wireless industrial network 100 communicating with the network controller 200, that each superframe 400 has one single guaranteed timeslot 420 and one shared timeslot 430, and that the method is performed by network controller 200. In this example, reception of data fails in the guaranteed timeslot 420 of the first superframe 400 and the shared timeslot 430 of the first superframe 400 is used for retransmission of the data from the node 300a to the network controller 200. Further in this example, reception of data is successful in the guaranteed timeslot 420 of the second superframe 400 and the shared timeslot 430 of the second superframe 400 might be used for transmission or reception of non-time critical data.

Guaranteed timeslot of first superframe: The pointer 610a of the application software 620 points at memory area A and the pointer 610b of the communication hardware 630 points at memory area B. Command1 is generated by the network controller 200 and stored in the memory cell as pointed at by the pointer 610a of the application software 620. Data1 as previously generated by the node 300a fails to be received by the communication hardware 630 from the node 300a and a status bit is set to indicate the failed communication for the memory cell as pointed at by the pointer 610b of the communication hardware 630.

Shared timeslot of first superframe: The pointers 610a, 610b still point as in the guaranteed timeslot 420 of the first superframe. Data1 is retransmitted by the node 300a and is now correctly received by the communication hardware 630 from the node 300a and stored in the memory cell as pointed at by the pointer 610b of the communication hardware 630.

Guaranteed timeslot of second superframe: The pointer 610a of the application software 620 points at memory area B and the pointer 610b of the communication hardware 630 points at memory area A. Command2 is generated by the network controller 200 and stored in the memory cell as pointed at by the pointer 610a of the application software 620. Data2 as previously generated by the node 300a is received by the communication hardware 630 from the node 300a and stored in the memory cell as pointed at by the pointer 610b of the communication hardware 630.

Shared timeslot of second superframe: The pointers 610a, 610b still point as in the guaranteed timeslot 420 of the second superframe. If needed, the shared timeslot 430 is used for transmission or reception of non-time critical data.

Figure 6:
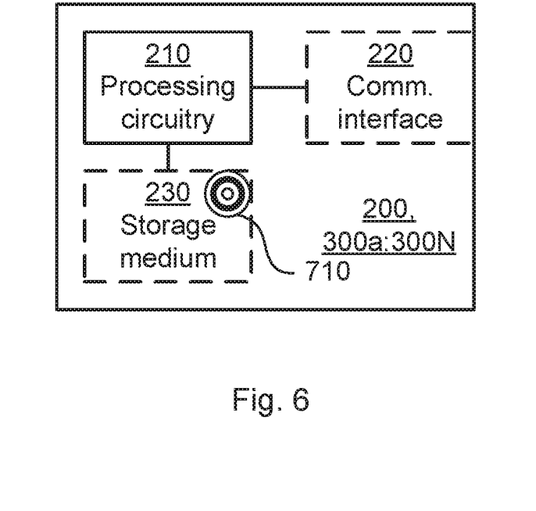
FIG. 6 is a schematic diagram showing functional units of a communication device according to an embodiment.

FIG. 6 schematically illustrates, in terms of a number of functional units, the components of a communication device 300a:300N, 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the communication device 300a:300N, 200 to perform a set of operations, or steps, as disclosed above. For example, the storage medium 230 may store the set of operations, and the processing circuitry 210 may be configured to retrieve the set of operations from the storage medium 230 to cause the communication device 300a:300N, 200 to perform the set of operations. The set of operations may be provided as a set of executable instructions. Further, the storage medium 230 may hold the memory 500. Further, the storage medium 230 may store the application software 620.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The communication device 300a:300N, 200 may further comprise a communications interface 220 at least configured for communications with other entities, nodes, functions, and devices of the wireless communications network 100, such as other communication devices 300a:300N, 200. As such the communications interface 220 may comprise one or more transmitters and receivers, comprising analogue and digital components. The communications interface 220 might comprise the communication hardware 630.

The processing circuitry 210 controls the general operation of the communication device 300a:300N, 200 e.g. by sending data and control signals to the communications interface 220 and the storage medium 230, by receiving data and reports from the communications interface 220, and by retrieving data and instructions from the storage medium 230. Other components, as well as the related functionality, of the communication device 300a:300N, 200 are omitted in order not to obscure the concepts presented herein.

Figure 7:
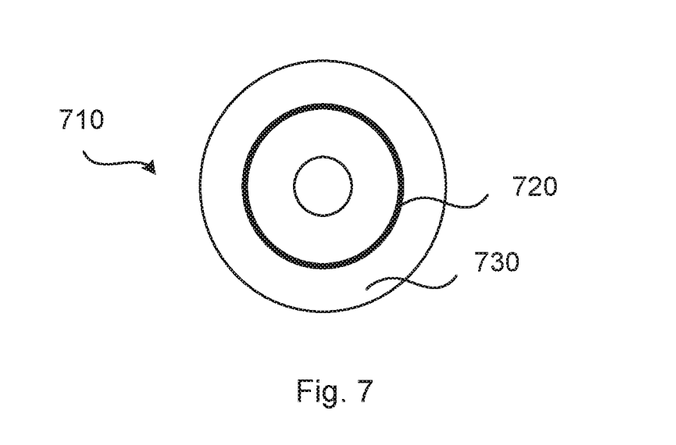
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for cyclic time-slotted operation in a wireless industrial network, the method being performed by a communication device, the communication device comprising a memory having a first memory area and a second memory area, each of the first memory area and the second memory area having status fields, the method including:
running an application software at an application layer, the application software being associated with a first pointer;
operating a communication hardware at a physical layer, the communication hardware being associated with a second pointer;
the first pointer and the second pointer in a given timeslot pointing at a respective different one of the memory areas, such that in the given timeslot the application software is enabled to access one of the memory areas and the communication hardware is enabled to access the other of the memory areas;

indicating, in the status field of any timeslot, failure of the communication hardware to transmit or receive a packet in the any timeslot; and
swapping the pointers to the memory areas at an end of each cycle of the cyclic time-slotted operation.

2. The method according to claim 1, wherein timeslots of each cycle are part of a set of guaranteed timeslots.

3. The method according to claim 2, wherein each of the first memory area and the second memory area has as many cells for the application software and the communication hardware to access as there are timeslots in the set of guaranteed timeslots.

4. The method according to claim 3, wherein each set of guaranteed timeslots is part of a superframe.

5. The method according to claim 2, wherein each set of guaranteed timeslots is part of a superframe.

6. The method according to claim 5, wherein each cycle has a duration of one superframe, and the pointers are swapped upon start of each superframe.

7. The method according to claim 6, wherein the application software is cyclically executed, such that one cycle of the application software is executed per superframe.

8. The method according to claim 6, wherein the superframe further includes a set of shared timeslots.

9. The method according to claim 5, wherein the application software is cyclically executed, such that one cycle of the application software is executed per superframe.

10. The method according to claim 5, wherein the superframe further includes a set of shared timeslots.

11. The method according to claim 10, wherein the shared timeslots are used for handling data that has not been successfully received or transmitted.

12. The method according to claim 1, wherein each cycle has a duration of one timeslot, and wherein the pointers are swapped upon start of each timeslot.

13. The method according to claim 12, wherein the application software is cyclically executed, such that the application software is executed once per timeslot.

14. The method according to claim 1, wherein to access one of the memory areas involves to read from, or write to, said the one of the memory areas.

15. A communication device for cyclic time-slotted operation in a wireless industrial network, the communication device comprising a memory having a first memory area and a second memory area, each of the first memory area and the second memory area having status fields, the communication device further including processing circuitry, the processing circuitry being configured to cause the communication device to:
run an application software at an application layer, wherein the application software is associated with a first pointer;
operate a communication hardware at a physical layer, wherein the communication hardware is associated with a second pointer;
wherein the first pointer and the second pointer in a given timeslot point at a respective different one of the memory areas, such that in the given timeslot the application software is enabled to access one of the memory areas and the communication hardware is enabled to access the other of the memory areas;
indicate, in the status field of any timeslot, failure of the communication hardware to transmit or receive a packet in the any timeslot; and
swap the pointers to the memory areas at an end of each cycle of the cyclic time-slotted operation.

16. A communication device for cyclic time-slotted operation in a wireless industrial network, the communication device comprising:
a memory having a first memory area and a second memory area, each of the first memory area and the second memory area having status fields;
a non-transitory computer readable storage medium comprising computer code; and
processing circuitry in communication with the storage medium, wherein the processing circuitry executes the computer code to:
run an application software at an application layer, wherein the application software is associated with a first pointer;
operate a communication hardware at a physical layer, wherein the communication hardware is associated with a second pointer;
wherein the first pointer and the second pointer in a given timeslot point at a respective different one of the memory areas, such that in the given timeslot the application software is enabled to access one of the memory areas and the communication hardware is enabled to access the other of the memory areas;
indicate, in the status field of any timeslot, failure of the communication hardware to transmit or receive a packet in the any timeslot; and
swap the pointers to the memory areas at an end of each cycle of the cyclic time-slotted operation.

17. The communication device according to claim 16, wherein timeslots of each cycle are part of a set of guaranteed timeslots.

18. The communication device according to claim 17, wherein each of the first memory area and the second memory area has as many cells for the application software and the communication hardware to access as there are timeslots in the set of guaranteed timeslots.

19. The communication device according to claim 17, wherein each set of guaranteed timeslots is part of a superframe.

20. A computer program product for cyclic time-slotted operation in a wireless industrial network, the computer program product comprising a non-transitory computer readable storage medium and a computer program stored on the non-transitory computer readable storage medium, the computer program comprising computer code which, when run on processing circuitry of a communication device including a memory having a first memory area and a second memory area, each of the first memory area and the second memory area having status fields, causes the communication device to:
run an application software at an application layer, wherein the application software is associated with a first pointer;
operate a communication hardware at a physical layer, wherein the communication hardware is associated with a second pointer;
wherein the first pointer and the second pointer in a given timeslot point at a respective different one of the memory areas, such that in the given timeslot the application software is enabled to access one of the memory areas and the communication hardware is enabled to access the other of the memory areas;
indicate, in the status field of any timeslot, failure of the communication hardware to transmit or receive a packet in the any timeslot; and swap the pointers to the memory areas at an end of each cycle of the cyclic time- slotted operation.

\* \* \* \* \*

UNITED STATES PATENT AND TRADEMARK OFFICE
CERTIFICATE OF CORRECTION

Page 1 of 1

PATENT NO. : 11,233,624 B2
APPLICATION NO. : 16/777520
DATED : January 25, 2022
INVENTOR(S) : Pang et al.

It is certified that error appears in the above-identified patent and that said Letters Patent is hereby corrected as shown below:

In the Claims

Claim 14, Column 11, Line 42; delete "said".

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*